May 30, 1967  R. H. KIRKHOF ETAL  3,321,888
PLASTIC BAG FORMING MACHINE
Filed Feb. 19, 1964

INVENTORS
RUSSEL H. KIRKHOF
RAYMOND T. HUMMEL SR.
BY RAYMOND J. HUMMEL JR.
ROBERT E. O'BRIEN

Price & Heneveld
ATTORNEYS

May 30, 1967 R. H. KIRKHOF ET AL 3,321,888
PLASTIC BAG FORMING MACHINE
Filed Feb. 19, 1964 5 Sheets-Sheet 2

INVENTORS
RUSSEL H. KIRKHOF
RAYMOND T. HUMMEL SR.
BY RAYMOND J. HUMMEL JR.
ROBERT E. O'BRIEN

ATTORNEYS

INVENTORS
RUSSEL H. KIRKHOF
RAYMOND T. HUMMEL SR.
BY RAYMOND J. HUMMEL JR.
ROBERT E. O'BRIEN

ATTORNEYS

United States Patent Office 3,321,888
Patented May 30, 1967

3,321,888
PLASTIC BAG FORMING MACHINE
Russel H. Kirkhof, Marne, Raymond T. Hummel, Sr., and Raymond J. Hummel, Jr., Ada, and Robert E. O'Brien, Grand Rapids, Mich., assignors to Kirkhof Manufacturing Corporation, Grand Rapids, Mich., a corporation of Michigan
Filed Feb. 19, 1964, Ser. No. 346,004
7 Claims. (Cl. 53—186)

This invention relates to plastic bag forming equipment, and more particularly to a novel apparatus and method for forming custom plastic bags as needed at the place of use. It is especially adapted for forming plastic bags of any desired length from an elongated sleeve, either before or after the "bag" portion is filled with articles.

Plastic bags have gained wide spread adoption by the public in recent years. The moistureproof, dustproof, characteristics of plastic bags render them desirable for countless types of articles. They are conventionally manufactured in mass and purchased by the gross in different sizes by article manufacturers, wholesalers and/or retailers for pre-bagging and the like.

Usage of plastic bags at check-out counters in the place of bulk containers is almost non-existent, however. Paper bags and paper board boxes still are preferred for this purpose. Plastic bags simply have not lent themselves conveniently to the almost numberless different sizes required for different size orders and types of articles. Also, plastic bags are not readily handled when empty, since they tend to cling to each other. Further, their expense is still too great to enable liberal usage of large bags for smaller orders.

This invention was created to solve these problems by providing apparatus for creating custom size bags, inexpensively and conveniently at check-out counters, or any other desired location.

Another area in which shoppers have a need is that of handy shopping containers. Presently, the only widely available shopping containers are reinforced paper bags. Providing convenient dispensing means for these has been impractical for economical and other reasons. Consequently, some store owners refuse to even handle them. Damp weather further creates definite problems with paper shopping bags. They are not moistureproof nor dustproof. This invention also fills this definite need.

It is an object of this invention to provide a plastic bag forming apparatus capable of dispensing bags of any chosen length from a few inches to several feet.

It is another object of this invention to provide a plastic bag forming apparatus capable of rapidly and conveniently creating and dispensing custom size plastic bags of firm, moistureproof, dustproof construction, and to do so in rapid succession. The structure is also capable of dispensing bags from a compact, small housing, requiring only a few cubic feet of displacement. The dispenser can be placed in any convenient location of a store for customer usage. Its simple operation enables unskilled shoppers to form and remove bags of chosen length one after the other. The resulting bags can be employed for articles of most any type without fear of moisture damage to cause tearing.

It is another object of this invention to provide a bag forming machine enabling check-out counters in stores, such as grocery stores and the like, to form bags from a continuous sheath simultaneously with filling them. In fact, the "bag" can be filled before it is formed with one form of the invention so that the necessary length need not be guessed at, but is exactly obtained.

It is another object of this invention to provide a plastic bag forming apparatus allowing bags of infinite variety of sizes to be obtained in a few seconds, conveniently without skill and practically without effort. The bag forming apparatus fits readily and compactly into check-out counter space. In fact, its upper surface forms part of the check-out counter if desired.

Still another object of this invention is to provide a bag forming apparatus causing the bag forming sleeve to be automatically advanced for convenient grasping once the completed filled bag is removed. The apparatus further will not feed up a new section until the filled bag is removed.

Another object of this invention is to provide a bag forming apparatus capable of creating one bag after another from a simple roll of plastic sheet sleeve material.

It is another object of this invention to provide a novel method of forming bags from a double walled plastic sleeve.

These and other objects of this invention will become apparent upon studying the following specification in conjunction with the drawings in which.

Figure 1:
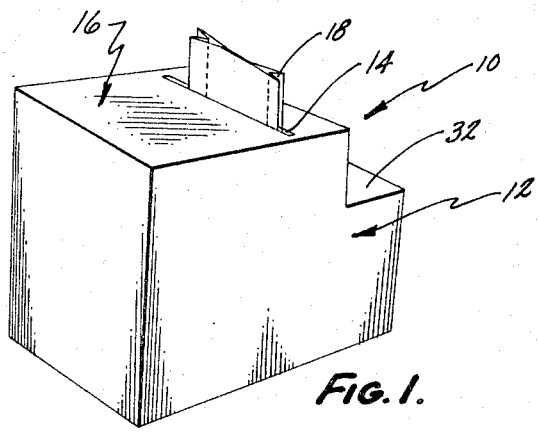
FIG. 1 is a perspective view of the apparatus.

Referring specifically to the drawings, the novel bag forming apparatus 10 includes a housing 12 having an elongated slit 14 in its top surface 16 for emergence of the end of a continuous plastic sleeve 18.

Figure 2:
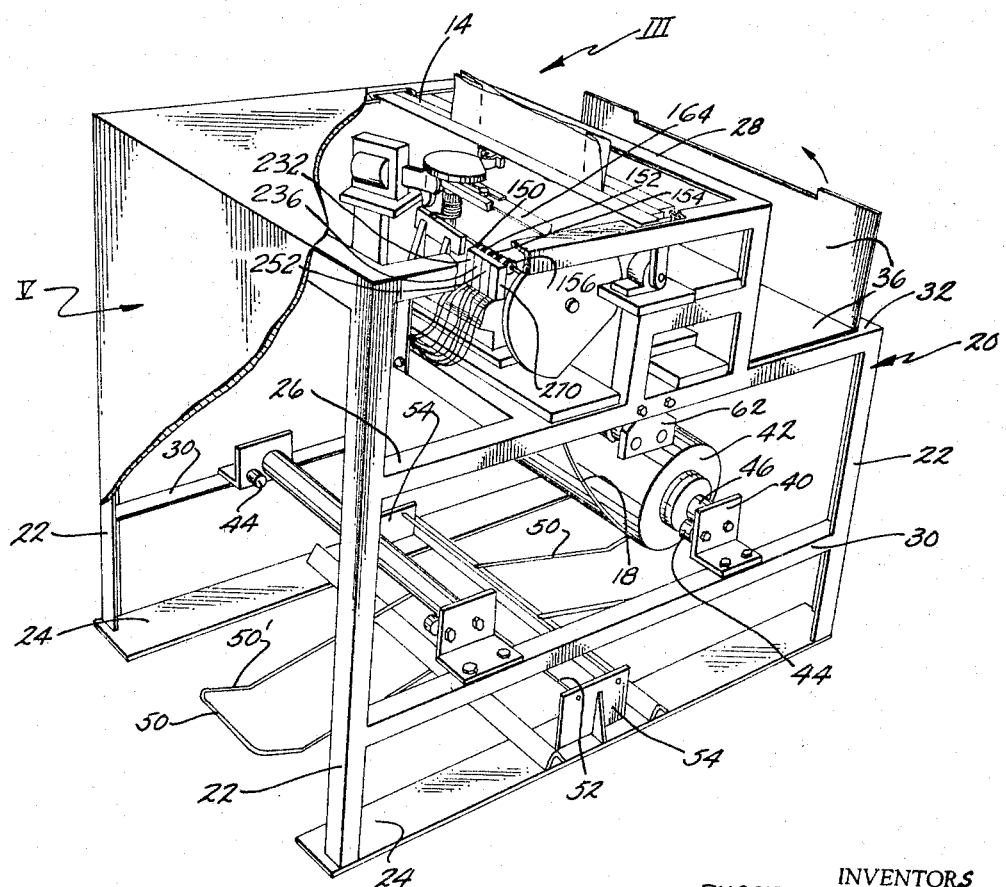
FIG. 2 is an enlarged perspective view of the apparatus in FIG. 1 showing the housing partly removed.

The housing enclosure may comprise suitable sheet metal material supported on and attached to a rigid frame structure 20 (FIG. 2). This frame may include a plurality of four upright legs 22 supported on a suitable pair of skids 24. The tops of the legs are connected by elongated braces 26 at an intermediate level and 28 at the top. Near the bottom is a pair of additional cross braces 30 which support the rolls of plastic sheet in the manner to be described hereinafter.

Preferably, one end of the housing has a lower platform portion 32 for convenience in use in a store at the check-out counter. This is optional. Portions of the housing enclosure may be made to be folded back as is the L-shaped portion 36 shown in its closed position in FIG. 1 and pivoted backwardly on suitable hinge elements (not shown) in FIG. 2, onto platform portion 32.

Supported on cross-members 30 between the legs is a plurality of four L-shaped mounts 40. Extending between each two of these mounts is a roll 42 of plastic sheet material 18 as shown in FIG. 2. The ends of this roll are supported on suitable rotatable bearings 44 mounted to the upstanding leg of bracket mounts 40. Thus, stub end shafts 46 rest upon two of these on each end. The second pair of like supports is for a spare roll of plastic sheath. Only one roll is used at a time. In order to facilitate mounting of each new roll of plastic sheet film, a hoisting bracket 50 is provided on each end of the apparatus. These each comprise a U-shaped element with a cross-bar 52. The cross-bar has its ends pivotally mounted in plates 54 affixed to skids 24. The ends of the legs of the U-shaped element are welded to this cross-bar. The element has a slight V-shaped configuration. Thus, a roll can be placed in the depression 50' of the U-shaped element, and hoisted up onto bearing rollers 44 by manually lifting the bracket.

The plastic film sleeve is fed from roll 42 upwardly through the operating mechanism of the structure and out the top slot 14.

Figure 3:
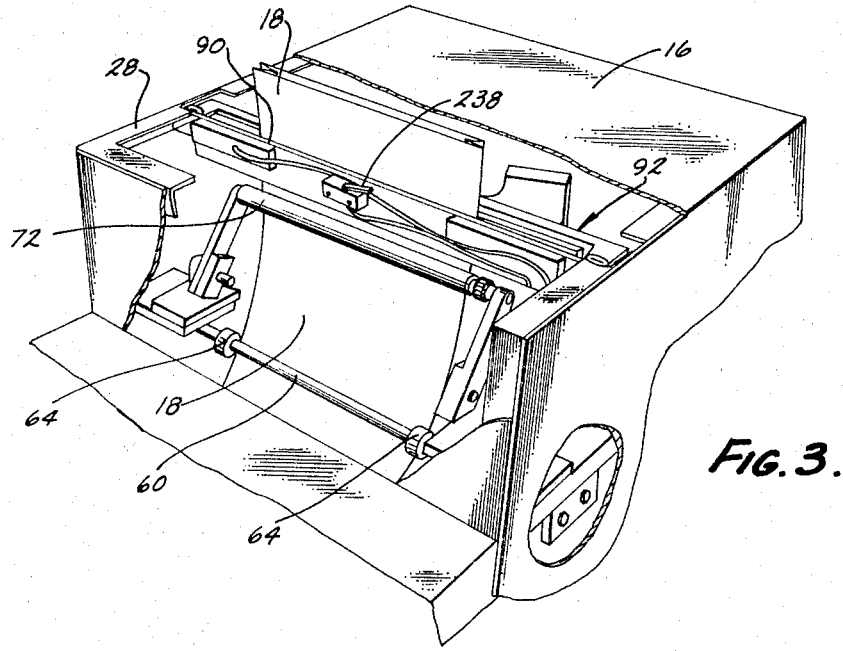
FIG. 3 is a fragmentary perspective enlarged view of the apparatus in FIGS. 1 and 2, taken from the indicated direction at III.
Figure 6:
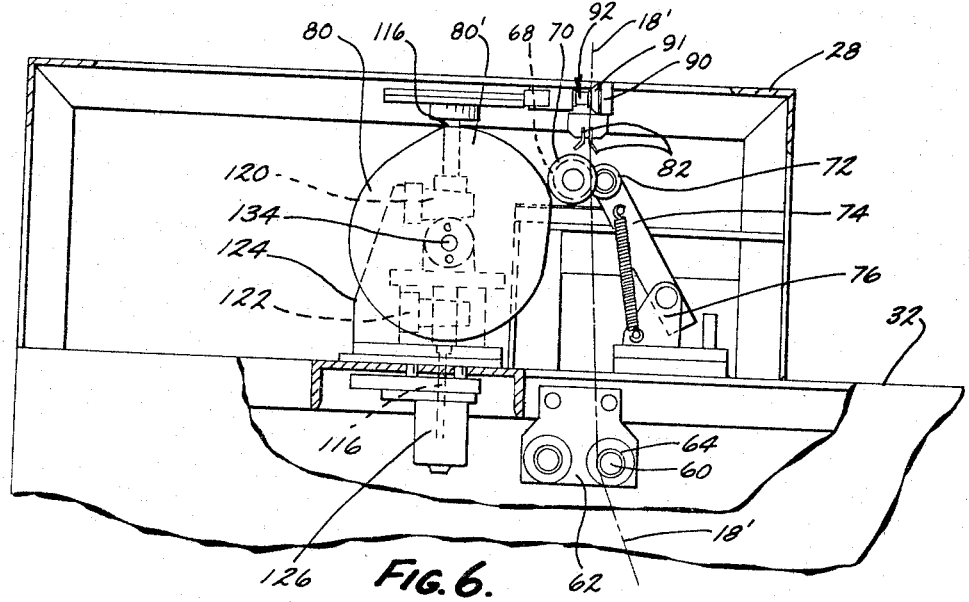
FIG. 6 is a side elevational fragmentary view of the operating mechanism of the apparatus illustrated in FIG. 2.

The path of the film is illustrated by phantom line 18' in FIG. 6. The film passes from roll 42, up around a guide roll 60. Two of these guide rolls are provided for the two respective rolls, depending on which one is being used at the time. These guide rolls have their ends rotatably mounted in a pair of depending support flanges 62. Each of the guide rolls has a pair of enlarged guide discs 64 mounted on its opposite ends as illustrated in FIG. 3. These control the lateral location of the edges of the film sheet material 18 as it rises.

The film then passes up adjacent a rotatably mounted, stationary roll 68. This roll likewise has enlarged discs 70 on its ends to control the lateral location of the sheet material and to serve as driven elements in a manner to be described. The surface of this roll 68 is preferably of a resilient material to provide a high friction contact surface. Biased against the opposite side of the sheet material is a second resilient type roller 72, rotatably mounted on the upper end of a pair of spaced arms 74. The lower end of these arms are pivotally mounted to a pair of brackets 76. A biasing tension spring 78 extends between these brackets and the upper or intermediate ends of arms 74 to bias roller 72 against roller 68 with the sheet material therebetween.

Roller 68 is normally free to revolve, as is roller 72. However, when the protruding portion 80' of rotatable cam 80 has its surface in contact with enlarged portion 70 of roller 68, this roller is positively driven to pull sheet material 18 from roll 42, and advance it upwardly through the mechanism.

Positioned above these rollers is preferably a pair of convergent sheet guides 82. The film passes through the guides and upwardly between a fixed support 90 and a shiftable heater mechanism 92.

Figure 7:
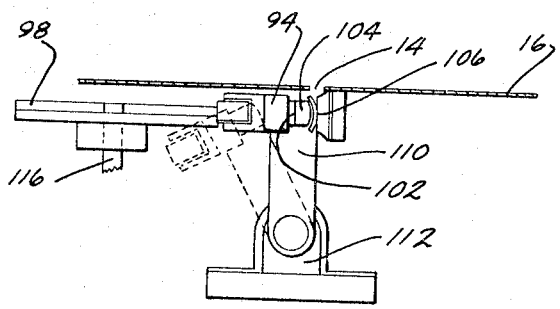
FIG. 7 is an enlarged fragmentary view of the portion of the apparatus in FIG. 6.

This heater mechanism 92 includes a main support bar 94 (FIG. 4) with a cam follower roller 96 mounted centrally on its backside. The bar 94 is biased toward a control cam disc 98 to cooperate with cam follower wheel 96. This bias force is obtained by any suitable means, such as coil springs 100 between the ends of bar 94 and surface 102 formed in a cutout section of the upper brace supports 28. Adjacent this bar is a layer of electrical insulation material 102. The heater element 104 mounted to the bar, but spaced therefrom by insulation material 102, serves to fuse the sheets together. It may comprise a suitable ribbon type resistance heater 106. It preferably employs a nylon tape with the resistance element therein in conventional fashion. (FIG. 7) The opposite ends of support 94 are mounted to a pair of downwardly depending legs 110, which are in turn pivotally mounted to supports 112. (FIG. 7) Thus, with rotation of cam disc 98 on its shaft 116, when flat side 98' of the disc is adjacent cam follower 96, bar 94 is allowed to move backwardly under the force of its bias away from fixed support 90. But when the remaining portion of the edge of disc 98 contacts follower 96, the bar is shifted into engagement with the sheet bag material against fixed element 90, to secure it and also to heat seal it when the heat is applied. The support 90 may also include a like ribbon heater element 91 on its surface. (FIG. 6)

Shaft 116 for cam disc 98 is supported in suitable vertically spaced pillow blocks 120 and 122 (FIG. 6) attached to vertical supports 124. This shaft is operably connected to an electrical motor means 126 mounted beneath the mechanism (FIG. 6) for rotational driving thereof.

Figure 5:
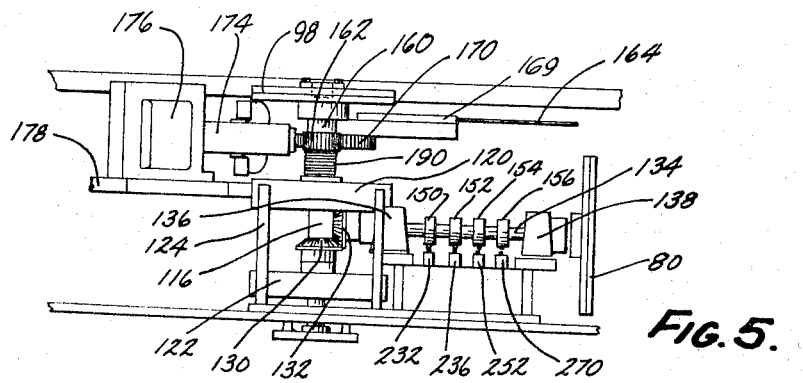
FIG. 5 is an end elevational view of the operating mechanism taken from the direction V in FIG. 2.

Keyed to shaft 116 is a bevel gear 130 (FIG. 5). Engaged with this bevel gear is a vertically oriented, second bevel gear 132 mounted on a horizontal rotational shaft 134. This second shaft is supported by horizontally spaced pillow blocks 136 and 138, and has fixedly attached to its outer end a vertically oriented drive cam disc 80. Thus, when motor 126 drives shaft 116, it not only rotates cam disc 98, but also drive disc 80. Shaft 134 also has mounted thereto four switch control cams 150, 152, 154, and 165 (FIG. 5) for purposes to be discussed hereinafter.

Mounted on a bearing sleeve around the upper portion of shaft 116 is a knife blade holder 160 which includes an annular collar and a radially protruding sleeve. Fixedly attached to this sleeve is a spur gear 162 (FIG. 5). Special knife blade 164 is mounted in the sleeve, which includes an underlying plate and two overlying lateral flanges extending around the sides of the blade. Blade 164 is thus pivotal around shaft 116, independent of the rotation of this shaft by motor 126. This pivotal action is controlled by the interengagement of spur gear 162 with an intermeshing elongated gear rack 170. This gear rack has a shank 172 connected to armature 174 of a reciprocable solenoid 176.

Figure 4:
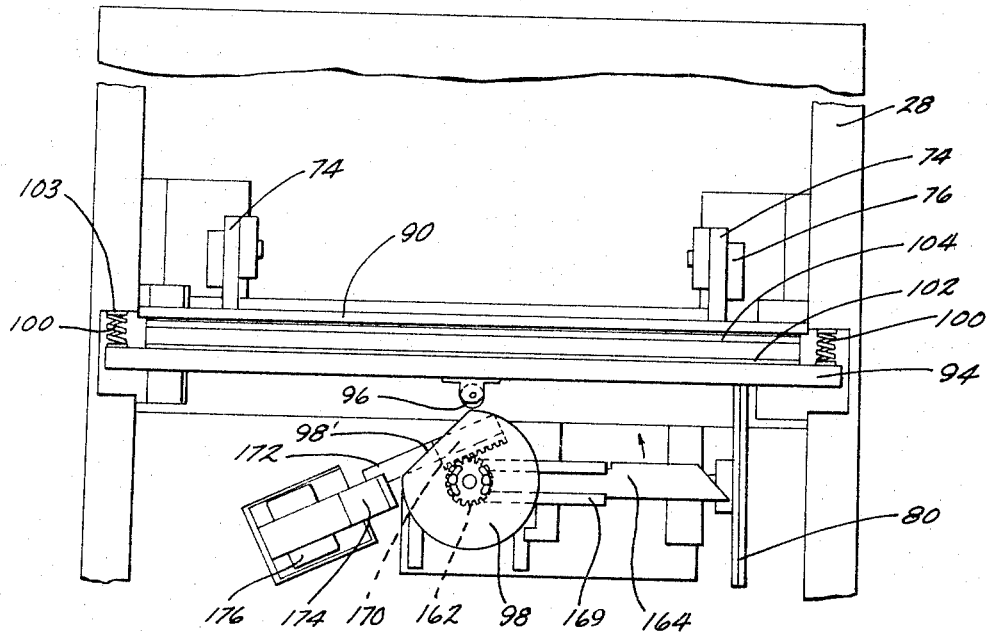
FIG. 4 is a plan fragmentary view of the novel apparatus.
Figure 8:
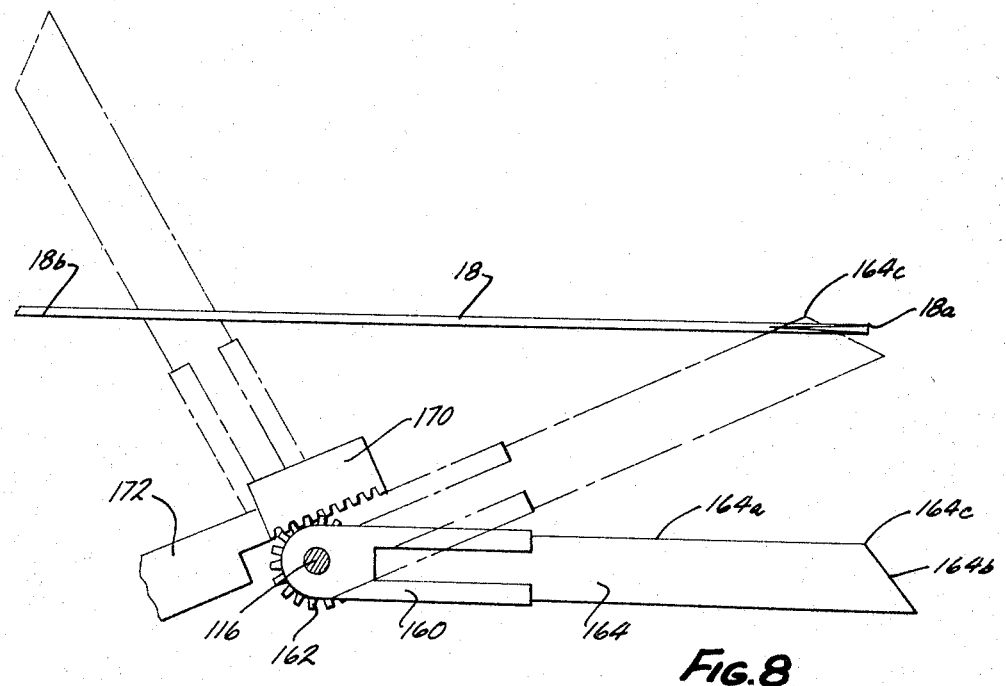
FIG. 8 is a plan view of the cutting knife and its action on the plastic sheet.

The solenoid 176 is fixedly attached to support means 178 of the apparatus (FIGS. 4 and 5). Actuation of the solenoid thus causes retraction of armature 174, shank 172 and gear rack 170, to rotate gear 162 and thus rotate knifeholding means 169 and blade 164. The blade therefore moves in the arcuate direction indicated by the arrow in FIG. 4, into engagement with the sheet material 18 held by the heater bar mechanism. The blade is normally biased to its retracted position shown in solid lines in FIGS. 4 and 8, by a coil spring 190 wrapped around post 116 and anchored at its lower end to support 120. The upper end is secured to bearing collar 160 and gear 162. Shifting of the blade toward the material is therefore against the bias of this spring (FIG. 5).

The blade 164 includes a first elongated sharp edge 164a which is generally parallel to the sheet material sleeve 18. The end of the blade opposite its pivotal mount includes a second diagonal, sharp edge 164b. This second sharp edge is foreshortened with respect to edge 164a, being only slightly longer than the width of the blade. It is at an obtuse angle with respect to edge 164a, and joins the edge 164a in a sharp point juncture 164c. The juncture point 164c contacts the sheath material 18 first to puncture it when the blade is pivoted. This contact is adjacent one end 18a of the sheath, and is actually within the limits of the double fold of the pleat on the edge of the band of sheath material. It will be understood that the sheath or sleeve has a continuous surface around its periphery, and V-shaped inner tucked folds on the ends to allow expansion of the material when employed as a bag. Point 164c punctures the bag, and creates a small slit intermediate the ends of the bag and adjacent end 18a. As the knife continues to rotate (as indicated by the phantom lines showing two of its positions in FIG. 8), the two surfaces 164a and 164b cut the sheath material in opposite directions, simultaneously, toward side edges 18a and 18b. The cut is started near end 18a, with the puncture taking place sufficiently close to the end so that shortened edge 164b can overlap the edge of the bag to sever it completely through. The knife continues to cut the bag in the opposite direction towards edge 18b by the blade edge 164a until the sheath is severed completely.

Figure 9:
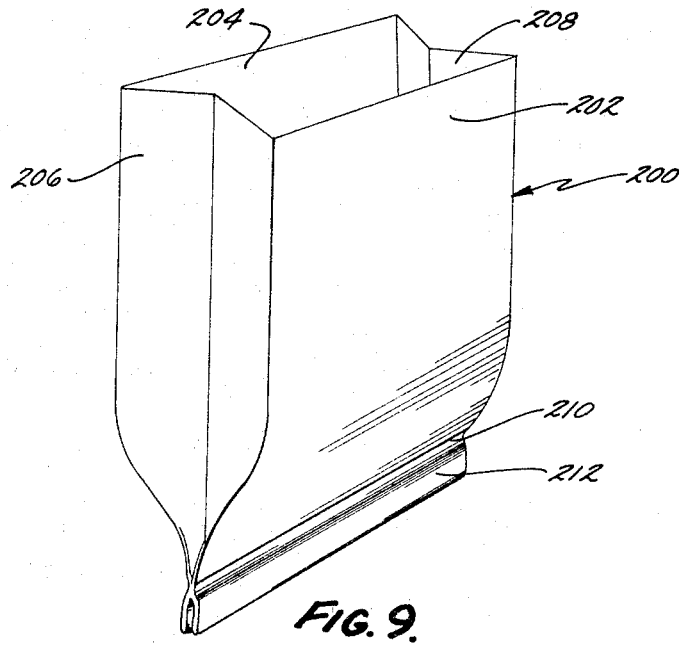
FIG. 9 is a perspective view of a bag formed of the apparatus.

The purpose of the apparatus is to form a bag of desired length, and of general configuration illustrated in FIG. 9. The bag 200 includes side walls 202 and 204 integrally joined by V-shaped pleats or folds 206 and 208 on the opposite ends. The lower end of the bag is heat sealed from edge to edge at 210, and severed along the bottom 212.

The bag initially comprises a portion of the continuous elongated rolled sheath. The bag material is of relatively sturdy, thermoplastic material such as polyethylene, to readily support articles placed in it.

Figure 10:
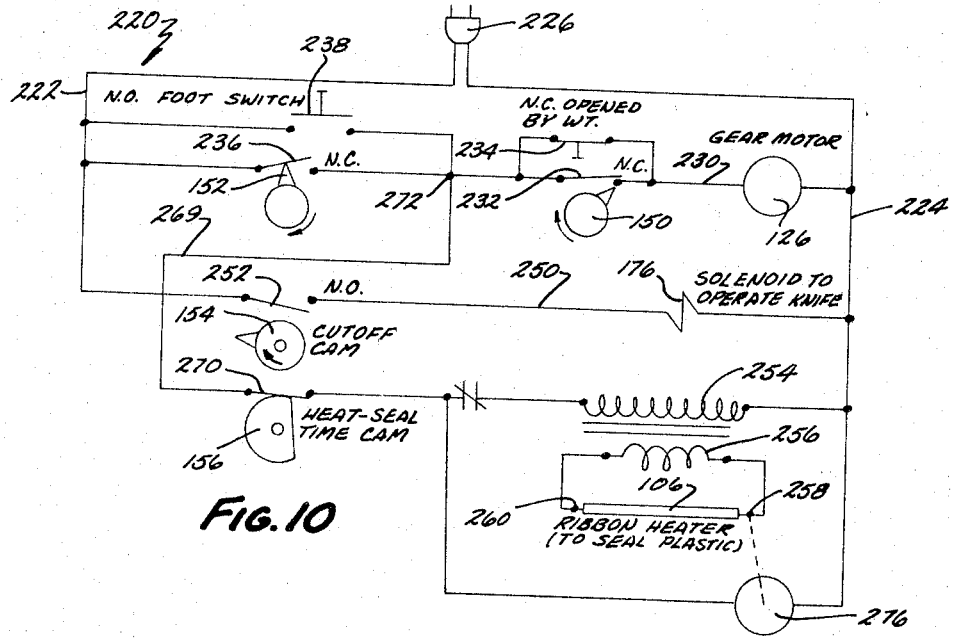
FIG. 10 is a schematic circuit diagram of one form of the control system of the novel apparatus.
Figure 11:
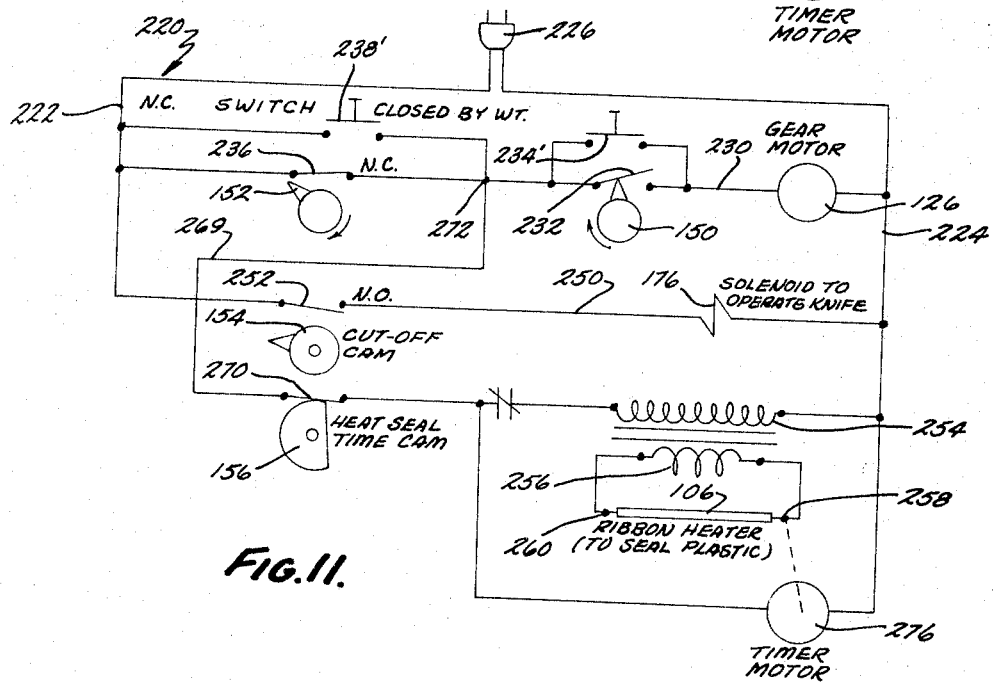
FIG. 11 is a schematic circuit diagram of a second form of the control system of the novel apparatus.

The apparatus is controlled through one of two slightly different control circuits like those illustrated in FIG. 10 or in FIG. 11. The circuit 220 in FIG. 10 includes a pair of input power leads 222 and 224 connected to a suitable male plug 226 for attachment into a conventional outlet. Between these two leads, a gear motor or other equivalent motor means 126 is electrically connected. The line 230 for this motor between the two leads 222 and 224 includes a switch 232 which is normally biased to a closed position. A cam 150 (FIG. 10 and FIG. 5) includes a projection to hold this switch open in one position of the cam. In parallel around this switch is a normally closed switch 234. In series with switch 232 and switch 234 is a switch 238 normally biased open. In parallel with switch 238 and in series with switches 232 and 234 is another switch 236 operated by a cam 152 (FIGS. 5 and 10). Switch 234 is mounted adjacent slot 14 and is normally covered by a portion of housing 16 (FIG. 3) and more specifically portion 36 shown pivoted downwardly in FIG. 2. The switch arm can be depressed by weight on panel 36.

Also connected between leads 222 and 224 is solenoid 176 for actuating the knife. This solenoid is on line 250 which also includes a (normally biased open) switch 252. This switch can be closed by a cam 154 in one position.

Also electrically connected into the circuit is the primary coil 254 cooperating with secondary coil 256 attached electrically to the ribbon type heater 106 connected between terminals 258 and 260. Coil 254 is connected between leads 222 and 224 through a switch 270 which is normally biased open and is controlled by a cam 156. Switch 270 is also in series with switches 236 and 238 due to the electrical juncture at 272. The ribbon heater is controlled by a timer motor 276 in parallel around the secondary coil 254 and thus connected to the leads 222 and 224 through the switches 270 and 236 or 238. This timer motor is to control the exact fraction of a second of actuation of the heater in a manner to be described hereinafter.

*Operation*

To begin the operation of the apparatus, a roll 42 of the plastic sheath material is mounted on bearings 44 between plates 40 by opening up the housing; resting the roll in depression 50' of bracket 50 and hoisting the bracket and roll to lift and drop the latter within the bearing supports 44. The free end of the sheath 18 is then fed upwardly (FIG. 2) around its guide bar 60 between discs 64 (FIGS. 3 and 6), up between rollers 68 and 72, through guides 82, and between support 90 and heater assembly 92. The heater assembly is at this state pivoted backwardly as illustrated by the phantom lines in FIG. 7, to allow easy passage of the sheath material.

Thus, referring to FIG. 10, foot switch 238 which is normally open is also open at the beginning of the operation. The normally closed switch 234 which can be opened by the bias of weight on the upper panel 32 is normally closed as in FIG. 10. Cam 150 is normally a few degrees past contact with switch 232 so that this switch is closed at the beginning of the operation. Cam 152 on the other hand is in contact with the switch 236 to hold it open. Assuming that a small portion of the plastic sheath 18 protrudes out the slot 14 the unit is then ready for operation.

Assuming that the apparatus is employed at a check-out counter of a grocery store or the like, the clerk first grasps the protruding portion of the sheath, as illustrated in FIG. 1 or FIG. 2) and pulls it upwardly to provide the desired length of sheath portion to form the bag. He then begins filling the bag with the articles. The narrow slit 14 in the housing prevents the articles from falling into the housing. Rather, the weight of the articles rests upon upper panel 16 of the housing. If the clerk wants to make the bag a little longer after he has put articles in it, he merely pulls it up a little further and continues to fill it. Thus, he can match the exact quantity of material with the exactly proper size bag.

When the clerk decides that he has reached the proper amount of articles and the proper length of bag, he depresses a foot switch 238 momentarily. This closes the circuit from lead 222 through switch 238, switch 234, and motor 126 to lead 224. Motor 126 therefore rotates the vertically oriented shaft 116 (FIG. 6), bevel gears 130 and 132 (FIG. 5), and shaft 134. The clerk must hold switch 238 closed for a second or so to allow shaft 134 to rotate cam 236 a few degrees and allow switch 236 to close, at which time he can release switch 238. The rotation of shaft 116 rotates disc 98, which shifts cam follower 96 and bar 94 (FIG. 4) to push the heater element over into engagement with the bag and the fixed support 90. This grips the bag material, and also places the heater in condition for operation. It serves to secure the bag against movement when the cutter operates. The electrical sequence is mechanically controlled by a combination of switches and switch controlling cams. Referring to FIGS. 2 and 5, the cams 150, 152, 154, and 156 mounted on shaft 134 to rotate therewith, cooperate respectively with switches 232, 236, 252, and 270. (See FIG. 10.) The cut off cam 154 closes switch 252 to actuate solenoid 176. This retracts solenoid armature 174 and thus shank 172 and gear rack 170. Gear rack 170 rotates spur gear 162 to pivot blade 164 around shaft 116 in the manner illustrated in FIG. 8. The sharp point 164c punctures the bag intermediate its ends, but closer to end 18a. Continued rotation causes the two blade edges 164a and 164b to sever the bag in opposite directions at the same time. Of course, edge 164b severs the one edge quicker. Then continued rotation of the blade severs the bag section completely off. The blade is then returned under the bias of coil spring 190 (FIG. 5), after deactuation of solenoid 176 with further rotation of cut off cam 154 to open switch 252. At about this same time, the cam 156 which is rotating on shaft 134 closes the normally opened switch 270, to pass current through coil 254 causing current to flow from secondary coil 256 to ribbon 106. It also actuates timer motor 276 controlling the heater. The heater tape on support 104 fuses and heat seals the bag along surface 210 as illustrated in FIG. 9. This lasts for approximately 1 and ½ seconds or so. Of course, this specific time will vary with the type of material, thickness of material, etc. The timer motor 276 controls this heating time exactly. The timer disc 156 continues to hold switch 270 into engagement since it cannot accurately control the timer like motor 276 can. Therefore, switch 270 is purposely held closed longer than the necessary time so that it will be sure not to cut off the heater too quickly. The gear motor 126 continues to operate to hold the heater bar in place for a proper cooling time, causing the complete fusion and proper sealing to take place before the bag can be removed. As soon as the proper time has elapsed, usually about five to six seconds, switch 232 is opened by cam 150. The filled bag is then free for removal. The store clerk then removes the bag with its contents in place and takes it to the desired location.

Removal of the weight allows the normally closed switch 234 to return to its closed position. Since cam 152 lags in rotation behind the cam 150 by about 20° or so, switch 236 still remains closed. Current thus flows from lead 222, through switch 236, switch 234, and motor 126 to lead 224. This current causes motor 126 to be actuated for an interval of time until cam 152 opens switch 236. During this same interval of time, the drive disc 80, and more specifically, its extended portion 80' contacts the peripheral surface of drive roller 68 to forceably feed the plastic sheath upwardly between it and roller 72. This causes a few inches of the sheath to protrude above the surface 16 again. After it extends a few inches upwardly, cam 152 opens switch 236 to stop the circuit. The unit is then ready for the next bag forming and filling operation.

Modification

The second modification of the apparatus employing the same construction and similar circuitry is illustrated in FIG. 11. In this instance, switch 238' is a normally open switch, closed by the weight of articles in the bag. Switch 234' is a normally open hand or foot switch. At the beginning of the operation, switches 234' and 238' are both open. Also, cam 150 is in contact with switch 232 to hold it open against its normally closed bias. Switch 236 is closed, with cam 152 being a few rotational degrees short of opening it. In order for the clerk to extend a portion of the bag sheath, he presses foot switch 234' to close it. This completes a circuit temporarily from lead 222 through switch 236, switch 234', and motor 126 to lead 224. This causes the motor to drive the mechanism illustrated in FIG. 6. Cam 150 is rotated to close switch 232 and allow the hand switch 234' to be released. The motor also causes disc 80 with its projecting portion 80' to rotate roller 68 and force up a sheath portion. The portion of the sheath, protruding a few inches above the apparatus, is available for grasping. At this time cam 152 contacts switch 236 to open it and stop the mechanism. The clerk then grasps the bag and pulls it to the desired length to make a bag. He then begins to fill the bag. Upon the weight of articles in the bag depressing panel 32 against normally open switch 238', the switch is closed. This completes a circuit from lead 222 through switch 238', switch 232, motor 126 and lead 224. A bag is then formed by the mechanism while the bag is continued to be filled. That is, disc 98 pushes the heater bar mechanism against the lower portion of the bag beneath panel 16 and slot 14. Also, the heater switch 270 is closed by cam 156 to actuate the coil 254 as well as the timer motor 276. The heater 106 is thus actuated for approximately 1½ to 2 seconds, after which it is deactuated by timer motor 276. Further, the solenoid 176 is actuated by closing of switch 252 with cut off cam 154, to rotate the knife and sever the bag from the remaining portion of the sheath. The bag seam is then allowed to cool, with the operation being stopped by rotation of cam 150 to open switch 232 and deactuate motor 126. The clerk coninues to fill the bag. It will be noticed that in this form of the invention, the bag must be extended to its proper height at the beginning, since, once the articles are begun to be put into it, the seam forming and severing operations occur automatically. The bag, when filled, is removed. To cause the sheath material to protrude again, the clerk merely depresses foot switch 234' in the manner just described, to repeat the entire operation.

Various additional advantages to those specifically recited above may occur to those in the art upon studying these preferred forms of the invention. Also, it is conceivable that certain additional minor modifications of the circuitry and/or structure preferred and disclosed may be made without departing from the scope of the inventive concepts set forth. Therefore, this invention is not to be limited merely to the exact detailed structure and circuits disclosed, but only by the scope of the appended claims, and the reasonably equivalent structures to those defined therein.

We claim:

1. A bag forming machine comprising: means for supporting an elongated sleeve of heat sealable plastic film; sleeve guide means; heat sealing means and cutting means adjacent said guide means to seal and sever a portion of said sleeve to form a bag; releasable sleeve advancing drive means; said drive means being normally out of driving engagement with the sleeve to allow the sleeve to be manually advanced desired amounts; actuator means for said heat sealing means and cutting means; and control means causing said drive means to be drivingly engaged with the sleeve after deactuation of said heat sealing means and cutter means, to advance the sleeve a small amount for convenient grasping; said control means including a weight controlled switch means shiftable with removal of a filled bag just formed to allow a new section of sheath to be advanced.

2. A bag forming machine comprising: a housing having means for supporting a roll of plastic sheath, and a slot outlet in the top thereof for sheath outlet; heat sealing means extending the width of the sheath beneath said top panel and adjacent said slot outlet; cutter means beneath said heat sealing means to sever the sheath; sheath advancing means in said housing, normally in a non-driving condition; power actuator means for said heat sealing means, cutter means, and sheath advancement means; and switch controller means for said power actuator means operatively associated with said power actuator means to allow heat sealing and cutting of the filled sheath portion to enable removal of a bag from said top, and then automatic advancement of another sheath portion; said switch controller means including weight shifted switch means adjacent said slot and shifted by an article filled sheath portion, to prevent advancement of the next sheath portion until removal of the article-filled bag.

3. A bag forming machine comprising: a housing having means for supporting a roll of plastic sheath, and a slot outlet in the top thereof for sheath outlet; heat sealing means extending the width of the sheath, beneath said top panel, adjacent said slot outlet; cutter means beneath said heat sealing means to sever the sheath; sheath advancing means in said housing, normally in a non-driving condition to allow manual sheath advancement through said slot to a desired length; power actuator means for said heat sealing means, cutter means, and sheath advancement means; electrical controller circuit means operably associated with said power actuator means, including a manual actuator switch and a weight responsive switch; said circuit means being responsive to said manual switch to initiate heat sealing and cutting, and being responsive to said weight responsive switch to initiate sheath advancement.

4. A bag forming machine comprising: a housing having means for supporting a roll of plastic sheath, and a slot outlet in the top thereof for sheath outlet; heat sealing means extending the width of the sheath, beneath said top panel, adjacent said slot outlet; cutter means beneath said heat sealing means to sever the sheath; sheath advancing means in said housing, normally in a non-driving condition to allow manual sheath advancement through said slot to a desired length; power actuator means for said heat sealing means, cutter means, and sheath advancement means; weight responsive switch to initiate heat sealing and cutting, and being responsive to said manual switch to initiate sheath advancement.

5. A bagging machine comprising: a housing including a top support panel having an outlet slit for plastic sleeve material; roller supporting means in said housing supporting a roll of plastic sleeve material; edge guide means for the sleeve material from the roll; an elongated shiftable gripping and heater means in said housing transverse to the sleeve material; a pivotally mounted cutter blade adjacent said gripping and heater means; solenoid actuator means for said cutter blade; sheath advancement roller means adjacent said cutter blade, and being alternately in driving engagement with drive means and in non-driving, freely rotating condition; power motor means operably engaged to shift said gripping and heater means, pivot said cutter blade, and engage and operate said drive means on said sheath advancement roller means; electrical power supply means to said heater means; control circuit means including a manual actuator switch, mounted externally of said housing, a weight responsive switch mounted adjacent said slot for operation by weight of articles in a sheath portion, and cam operated switch means for said heater means, power supply means for said solenoid actuator of said cutter blade; said manual switch and weight responsive switch being in electrical series with each other and with said power motor means; a first control cam operated switch in electrical parallel with said manual switch, and a second control cam operated switch in electrical parallel with said weight responsive switch; all of said cam operated switches being actuated by cams driven by said power motor means when in operation, said first and second control cam operated switches causing said sleeve advancement means to be delay-actuated after said gripping and heater means to feed new sleeve stock from said roll only after removal of a formed bag.

6. The machine in claim 5 wherein said switches actuate in sequence to cause heat sealing and cutting with subsequent automatic sleeve advancement upon shifting of said weight responsive switch with removal of a filled bag.

7. The machine in claim 5 wherein said weight responsive switch initiates heat sealing and cutting when shifted by weight, and said manual switch causes sleeve advancement after removal of a filled bag.

References Cited
UNITED STATES PATENTS

| | | | |
|---|---|---|---|
| 2,759,648 | 8/1956 | Piazze | 53—29 |
| 3,023,558 | 3/1962 | Mitchell | 53—256 X |
| 3,070,927 | 1/1963 | Lundahl | 53—186 X |
| 3,112,586 | 12/1963 | Luetzow | 53—256 X |
| 3,161,002 | 12/1964 | Duns | 53—186 |

GRANVILLE Y. CUSTER, Jr., *Primary Examiner.*